United States Patent
Naghi et al.

(10) Patent No.: US 6,881,147 B2
(45) Date of Patent: Apr. 19, 2005

(54) VIDEO GAME CONTROLLER WITH INTEGRATED MICROPHONE AND SPEAKER

(75) Inventors: Herschel Naghi, Los Angeles, CA (US); Craig Erickson, Stevenson Ranch, CA (US)

(73) Assignee: Nyko Technologies, Inc., Los Angeles, CA (US)

( * ) Notice: Subject to any disclaimer, the term of this patent is extended or adjusted under 35 U.S.C. 154(b) by 0 days.

(21) Appl. No.: 10/833,819

(22) Filed: Apr. 28, 2004

(65) Prior Publication Data

US 2004/0180720 A1 Sep. 16, 2004

Related U.S. Application Data

(60) Provisional application No. 60/476,439, filed on Jun. 6, 2003.

(51) Int. Cl.[7] .................................................. A63F 9/24
(52) U.S. Cl. .............................. 463/35; 463/36; 463/39; 273/148 B; 345/156
(58) Field of Search .......................... 463/1, 30, 35–39, 463/40–42, 43; 273/148 R, 148 B; 345/156–167

(56) References Cited

U.S. PATENT DOCUMENTS

| | | | |
|---|---|---|---|
| 5,149,104 A | 9/1992 | Edelstein | |
| 5,292,125 A | 3/1994 | Hochstein et al. | |
| 5,350,176 A | 9/1994 | Hochstein et al. | |
| 5,538,255 A | 7/1996 | Barker | |
| 5,685,775 A | 11/1997 | Bakoglu et al. | |
| 5,806,849 A | 9/1998 | Rutkowski | |
| RE36,574 E | 2/2000 | Hochstein et al. | |
| 6,120,379 A | * 9/2000 | Tanaka et al. | 463/44 |
| 6,241,612 B1 | 6/2001 | Heredia | |
| 2002/0010026 A1 | 1/2002 | York | |
| 2003/0003992 A1 | 1/2003 | Furuya | |
| 2003/0100363 A1 | 5/2003 | Ali | |

* cited by examiner

Primary Examiner—Mark Sager
(74) Attorney, Agent, or Firm—Christie, Parker & Hale, LLP

(57) ABSTRACT

A video game controller for a game console configured for playing an on-line game over a network. The video game controller includes a plurality of control elements suitable for receiving input from a user. An interface circuitry is used for communicating with at least one other game console through the game console over the network. A built-in microphone converts voice into an electrical signal output to be transmitted through the interface circuitry and the game console to at least one other game console. A built-in speaker converts an electrical signal output from at least one other game console received through the interface circuitry and the game console into an audible signal. The video game controller may also have a built-in video camera for taking video images and transmitting them through the interface circuitry. The video game controller may be coupled to the game console over a cable or over a wireless communication channel such as radio frequency channel or BLUETOOTH™. An expansion module having a built-in microphone and a built-in speaker may be used with a standard video game controller.

20 Claims, 5 Drawing Sheets

VIDEO GAME CONTROLLER WITH INTEGRATED MICROPHONE AND SPEAKER

CROSS-REFERENCE TO RELATED APPLICATIONS

This application claims priority to and the benefit of U.S. Provisional Patent Application No. 60/476,439 entitled "Video Game Controller with Integrated Microphone and Speaker," filed Jun. 6, 2003, the entire content of which is incorporated by reference herein.

FIELD OF THE INVENTION

The present invention is related to video game controllers, and more particularly to a video game controller that has integrated microphone and speaker and is suitable for playing multi-player, on-line games.

BACKGROUND

While playing on-line games with multiple players, either on a personal computer or on a dedicated video game console, it is often desirable to communicate verbally or via video with other players at remote locations who are playing the same on-line game at the same time. Conventional video game controllers do not provide capabilities for such verbal communications, and the players must use external microphone/speaker systems.

Such microphone/speaker systems include a headset to be worn on the head of a player. For example, a headset may include a microphone and a headphone or earphone. A headset is often uncomfortable if worn over a long period of time, and may also hinder body movements of a person wearing it. Further, a headset may need to be re-adjusted from time to time while playing the game. All these contribute to less than optimum environment for the enjoyment of on-line games.

SUMMARY

In an exemplary embodiment of the present invention, a video game controller for a game console configured for playing an on-line game over a network is provided. The video game controller includes: a plurality of control elements suitable for receiving input from a user; interface circuitry for communicating with at least one other game console through the game console over the network; a built-in microphone for converting voice into an electrical signal output to be transmitted through the interface circuitry and the game console to said at least one other game console; and a built-in speaker for converting an electrical signal output from said at least one other game console received through the interface circuitry and the game console into an audible signal.

In another exemplary embodiment according to the present invention, an expansion module for a video game controller of a game console configured for playing an on-line game over a network is provided. The expansion module includes: a built-in microphone for converting voice into an electrical signal output to be transmitted through the video game controller and the game console to at least one other game console over the network, and a built-in speaker for converting an electrical signal output from said at least one other game console received through the video game controller and the game console into an audible signal.

In yet another exemplary embodiment according to the present invention, an on-line game system for playing an on-line game over a network is provided. The on-line game system includes a plurality of game consoles, each running software for the on-line game; and a plurality of video game controllers, each video game controller being coupled to a corresponding one of the game consoles. At least one of the video game controllers is a first video game controller having a first built-in microphone and a first built-in speaker, or a second video game controller coupled to an expansion module. The expansion module coupled to the second video game controller includes a second built-in microphone and a second built-in speaker.

These and other aspects of the various embodiments of the invention will be more readily comprehended in view of the discussion herein and accompanying drawings.

DETAILED DESCRIPTION

Figure 1:
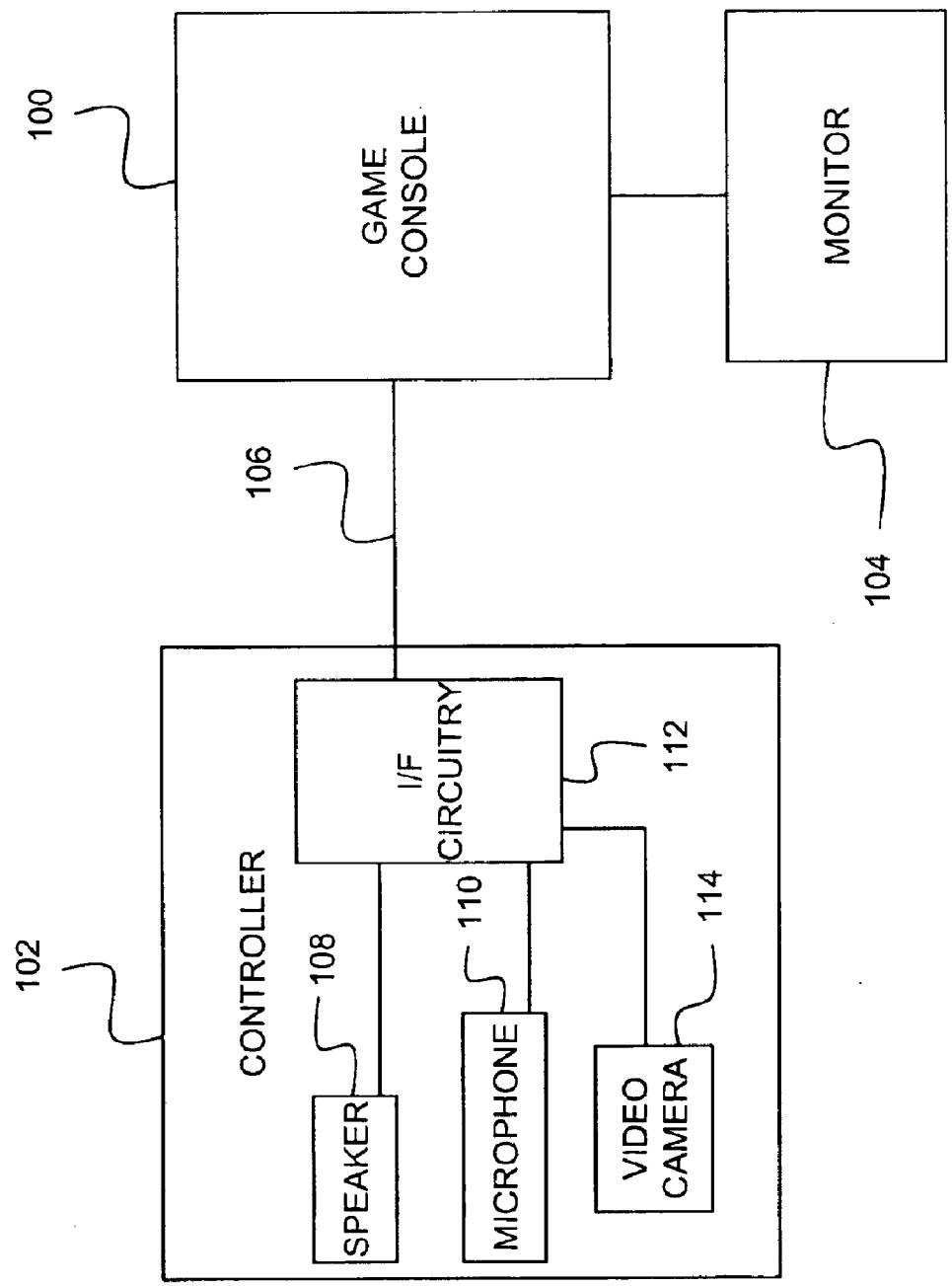
FIG. 1 is a system block diagram of a video game controller in an exemplary embodiment of the present invention coupled to a game console.

FIG. 1 is a system block diagram of a video game controller 102 in an exemplary embodiment of the present invention coupled to a game console 100. The video game controller may be a control pad, a steering wheel, a gun, a joystick, a mouse, a keyboard and/or any other suitable video game control device/input peripheral. The game console 100 is also coupled to a monitor 104, which can be a computer monitor, a TV screen, a projection screen, or any other device which may be used to display the graphics and video of the video game for viewing by the user. In other embodiments, the game console may have an integrated monitor, and a standalone (i.e., external) monitor may not be required. The game console 100, for example, may be a personal computer or a dedicated video game console such as XBOX®, PLAYSTATION®, PLAYSTATION 2®, NINTENDO 64®, or the like.

The video game controller 102, for example, may be plugged into a standard controller port of the game console 100, when it is a dedicated video game console. The game controller 102 may also be plugged into any other suitable parallel or serial ports available on a personal computer or a dedicated game console. The video game controller 102, for example, may be plugged into a Universal Serial Bus (USB) port.

The video game controller 102 has integrated thereon a speaker 108 and a microphone 110. In other words, the speaker and the microphone are built into the video game controller 102. The user may use the microphone and the speaker to communicate with other players at remote locations while playing on-line games. This way, the user can communicate with other on-line game players without having to wear a cumbersome headset and/or be bothered by wire(s) dangling from the ear. Further, the user does not have to deal with external microphone or with speakers that may be coupled to the game console and/or the monitor, which may be far away from the user. The on-line games may include, for example, games available from XBOX LIVE™ provided by Microsoft Corporation. As another example, the on-line games may include games compatible with the Network Adaptor for PLAYSTATION 2® provided by Sony Computer Entertainment, Inc. Other on-line games may include any video game which provides for multiple players at multiple remote locations to play the game simultaneously. The video game controller 102 also includes a built-in video camera 114, which may be a digital video camera. The video camera 114 may be used to take video images of the user using the video game controller or other images and transmit them through the interface circuitry 112 and over the bus 106. The video images, for example, may be displayed on the monitor 104 to be viewed by the user, stored in memory on the game console 100 and/or transmitted to remote game consoles while playing the on-line games for viewing by players at the remote game consoles. In other embodiments, the video game controller may have a slot or a port for connecting an output of an external video camera instead of, or in addition to, an integrated video camera.

The video game controller 102 includes interface circuitry 112 for communicating with the game console over the bus 106, which may be serial or parallel depending on the type of port used for video game interface. The video game controller 102 may have disposed thereon a number of control elements such as buttons, switches, joysticks, keys, dials and/or the like for receiving input from the user. The input provided by the user may then be converted to suitable electrical signals and provided to the game console over the bus 106.

The game console 100 may also send game related information to the video game controller 102. For example, the video game controller 102 may have one or more motors for allowing it to vibrate in response to a signal from the game console 100. For such vibration and/or to meet other power requirements, the video game controller 102 may receive power from the game console over the bus 106, it may have an internal power source (e.g., a battery), and/or it may receive power from a power outlet.

The speaker 108 and the microphone 110 are electrically coupled to the interface circuitry 112 so that the microphone converts voice into electrical signals, and the interface circuitry 112 transmits the electrical signals over the bus 106. Further, electrical signals representative of sound (e.g., voice, sound effects and/or game related sounds) may be received by the interface circuitry 112, and may be provided to the speaker 108 for generation of audible sound signals. The video camera 114 is electrically coupled to the interface circuitry 112 for transmission of the video images.

Figure 2:
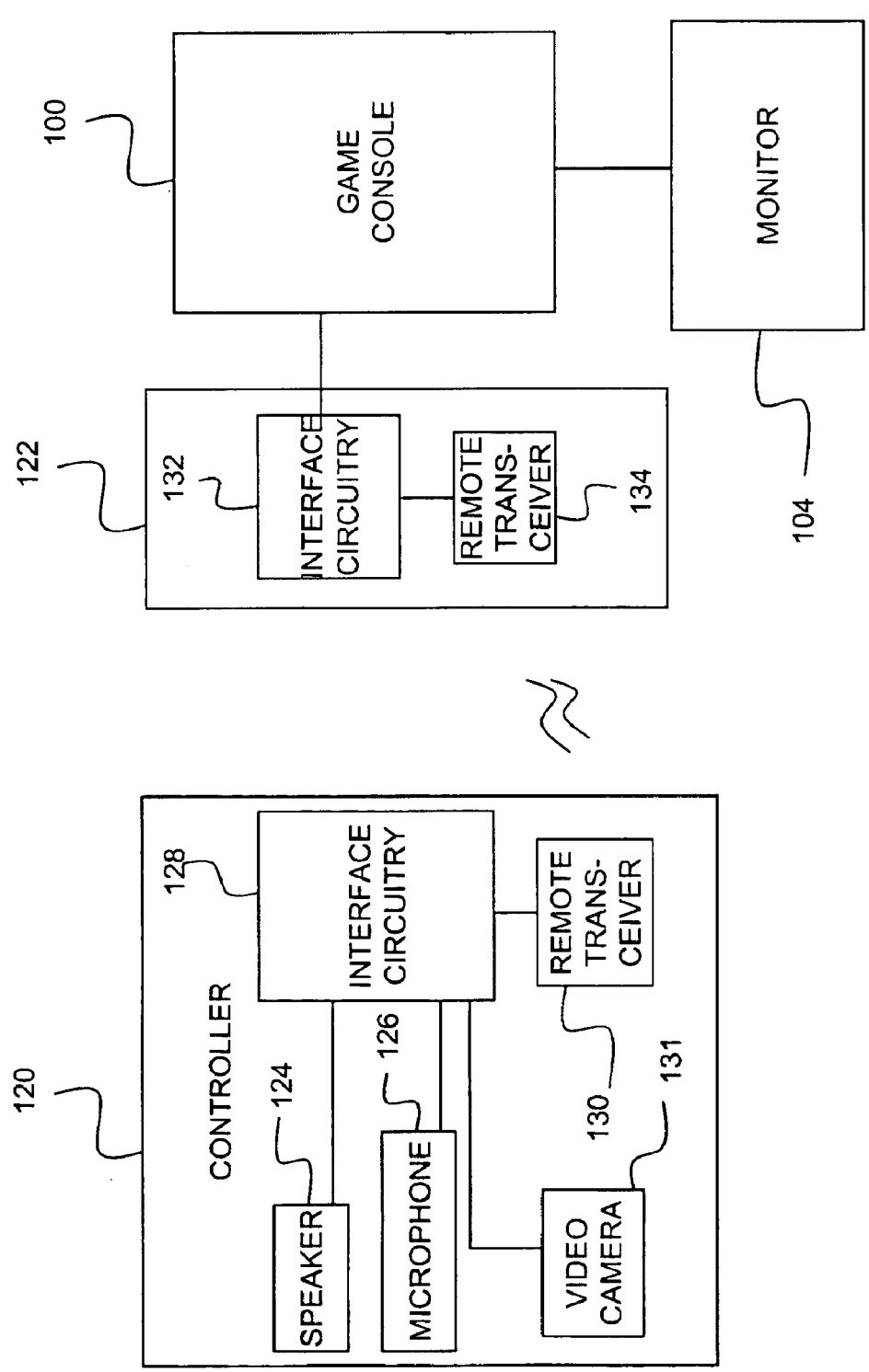
FIG. 2 is a system block diagram of a video game controller in another exemplary embodiment of the present invention coupled to a game console.

FIG. 2 is a system block diagram of a video game controller 120 in another exemplary embodiment coupled wirelessly to the game console 100 through a remote interface module 122. The video game controller 120 may be a control pad, a steering wheel, a gun, a mouse, a keyboard, a joystick and/or any other suitable video game control device/input peripheral. The game console 100 is also coupled to the monitor 104.

The video game controller 120 interfaces with the remote interface module 122 over a wireless communication channel, which may be a radio frequency channel or BLUETOOTH™. The video game controller 120 includes an internal power source (e.g., a battery) for its operation and for wireless communication with the remote interface module 122. The wireless controller 120 allows a user an additional freedom of movement, since the user is not limited by the length of a cable connecting the video game controller and the game console.

The remote interface module 122, for example, may be plugged into a standard controller port of the game console 100, such as a dedicated video game console. In another embodiment, the remote interface module 122 may be plugged into any suitable parallel or serial port available on a personal computer or a dedicated video game console. The remote interface module 122, for example, may be plugged into a Universal Serial Bus (USB) port of the game console 100. In yet another embodiment, the remote interface module 122 may be integrated with the game console 100. The remote interface module 122 may include an internal power source (e.g., a battery) and/or may receive power from the game console 100.

The video game controller 120 has integrated thereon (i.e., built-in) a speaker 124 and a microphone 126. The video game controller 120 includes interface circuitry 128, which is coupled to a remote transceiver 130 for wireless communication with the remote interface module 122. The video game controller 120 may have disposed thereon a number of control elements such as buttons, switches, joysticks, keys, dials, and/or the like for receiving input from the user. The input provided by the user may then be converted to suitable electrical signals and provided to the remote interface module 122 over the wireless link.

The video game controller 120 also includes a built-in video camera 131, which may be a digital video camera. The video camera 131 may be used to take video images of the user using the video game controller or other images and transmit them through the interface circuitry 128 and the remote transceiver 130. The video images, for example, may be displayed on the monitor 104 to be viewed by the user, stored in memory on the game console 100 and/or transmitted to one or more remote game consoles while playing the on-line games for viewing by players at the remote game console. In other embodiments, the video game controller may have a slot or a port for connecting an output of an external video camera instead of, or in addition to, an integrated video camera.

The remote interface module 122 includes a remote transceiver 134 for interfacing with the remote transceiver 130 of the video game controller 120 over the wireless link, which for example, may include radio frequency, BLUETOOTH and/or any other suitable wireless channel. The game console 100 may also send game related information to the video game controller 120. For example, the video game controller 120 may have one or more motors for allowing it to vibrate in response to a signal from the game console 100. The motors, for example, may operate using the internal power source.

The speaker 124 and the microphone 126 are electrically coupled to the interface circuitry 128 so that the microphone converts voice into electrical signals, and the interface circuitry 128 provides the electrical signals to the remote transceiver 130 to be transmitted over the wireless communication channel. Further, electrical signals representative of sound (e.g., voice, sound effects and/or game related sounds) may be received by the interface circuitry 128 through the remote transceiver 130, and may be provided to the speaker 124 for generation of audible sound signals. The video camera 131 is also electrically coupled to the interface circuitry 128 for transmission of the video images.

Figure 3:
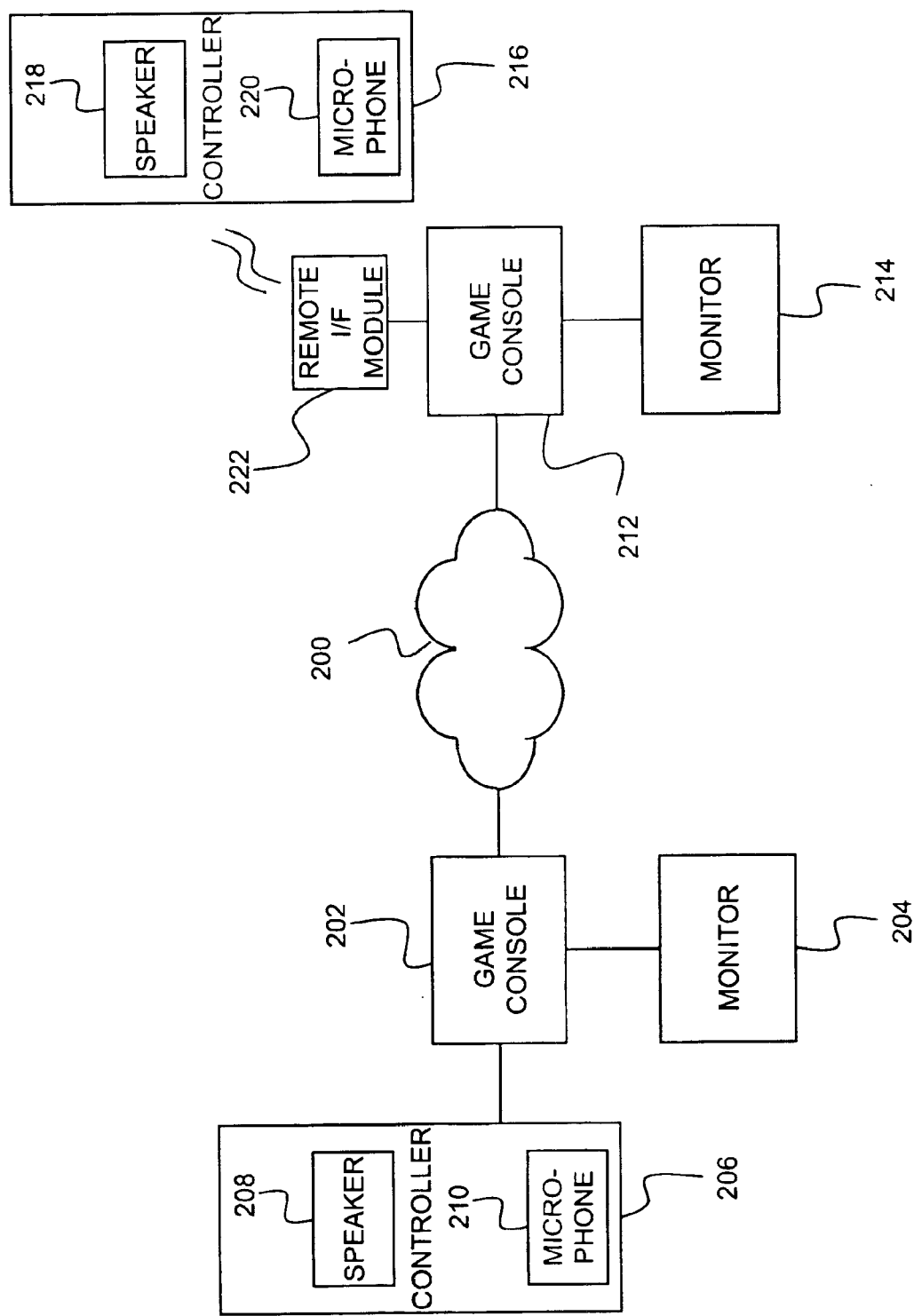
FIG. 3 is a system diagram of an on-line video game system in another exemplary embodiment of the present invention.

FIG. 3 is a system diagram of an on-line video game system in another exemplary embodiment according to the present invention. In the system of FIG. 3, a game console 202 is coupled to a game console 212 over a network 200. The network 200, for example, may include the Internet, an intranet, and/or any other public or private networks that are suitable for on-line gaming. The game consoles 202 and 212, for example, may include a personal computer that runs on-line game software or any of the dedicated game consoles such as, for example, XBOX®, PLAYSTATION®, PLAYSTATION 2® and/or NINTENDO 64®. The personal computer and the dedicated game consoles may have a CD/DVD/mini disk that contains the software for one or more on-line games. The on-line games, for example, may also include those provided through XBOX LIVE™ or PLAYSTATION®.

Figure 5:
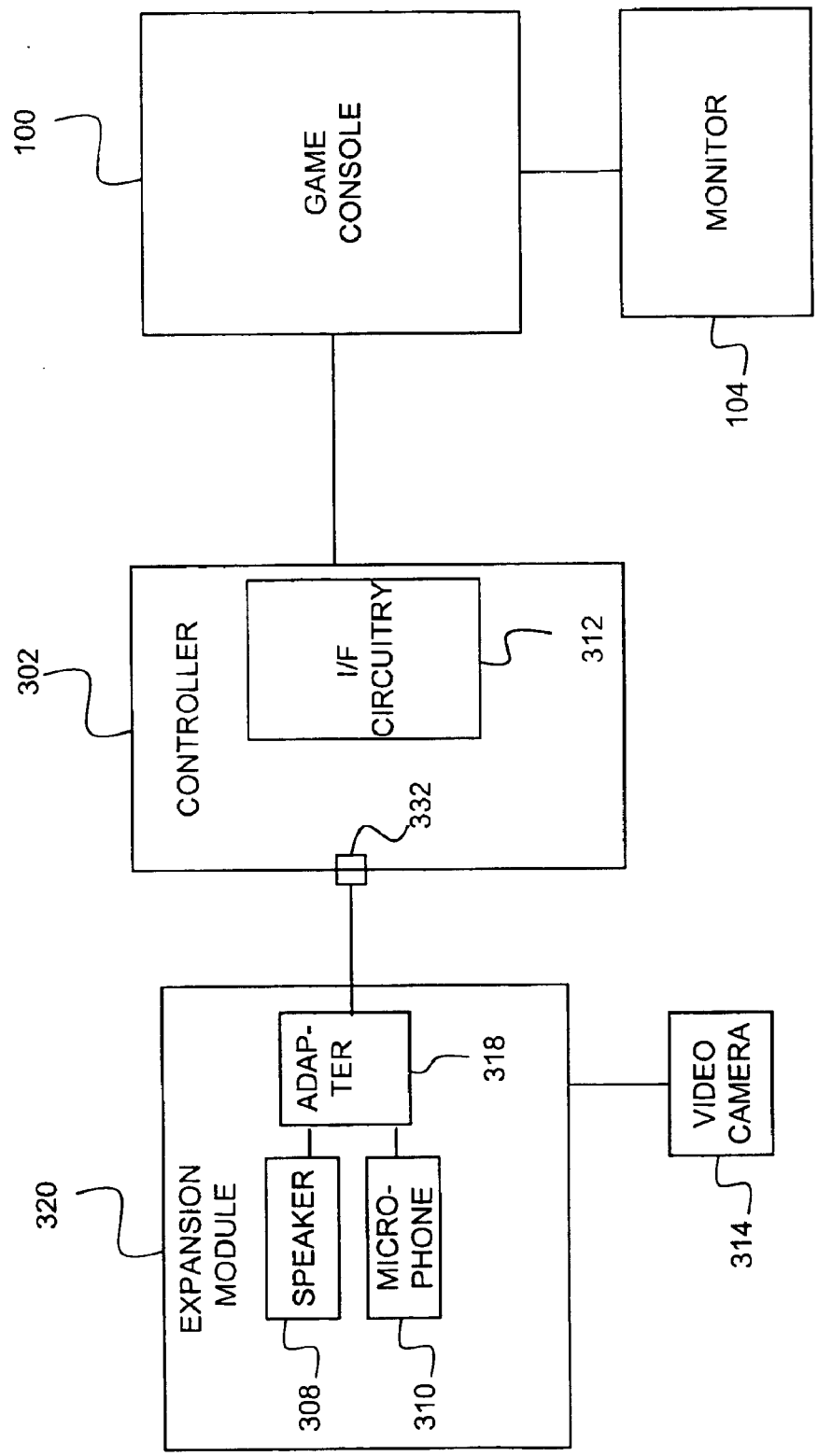
FIG. 5 is a system block diagram of the expansion module of FIG. 4 coupled to a video game controller.

While only two game consoles are shown in FIG. 3, in practice, there may be more than two game consoles connected to one another over the network 200. The game consoles connected through the network 200 may be game consoles as shown in FIG. 1, FIG. 2 or FIG. 5 and as described above. Further, the network 200 may also have connected thereon one or more network devices that are not related to the on-line gaming. The game consoles and other network devices, for example, may communicate with one another using one of the various different networking protocols such as, for example, TCP/IP.

The game console 202 is coupled to a monitor 204 that may be used to display graphics and video related to the on-line game for a user at the location of the game console 202. The monitor 204 may also be used to display video images of the user or other players and/or other video images that are received over the network 200. In other embodiments, the game console 202 may include an integrated monitor, and the monitor 204 may not be needed.

The game console 202 is controlled using a video game controller 206, which may be substantially the same as the video game controller 102 of FIG. 1, and may be a control pad, steering wheel, gun, mouse, keyboard and/or any other video game control device/input peripheral. The video game controller 206 may have one or more control elements such as buttons, keys, switches, joysticks, dials and/or the like for receiving input from the user to be provided to the game console 202.

The video game controller 206 has a speaker 208 and a microphone 210, which are integrated with the video game controller. This way, external headsets, earphones, headphones and/or microphones are not needed. The built-in speaker 208 and microphone 210 allow the user to communicate verbally with users at remote locations coupled to the network 200. The video game controller 206 may also include an integrated/built-in video camera (e.g., a digital video camera) or a port for an external video camera so that the user can engage in video conferences with other players while playing on-line games. The microphone, the speaker, and/or the video camera allows the user or users at the game console 202 to communicate with other players of the on-line game, such as the user or users playing at the game console 212, or other game consoles connected through the network 200.

The game console 212 may be any one of personal computer or dedicated video game consoles, and may be substantially the same as the game console 202. The game console 212 is coupled to a monitor 214 for displaying video and graphics related to the on-line game. The monitor 214 may also be used to display video images of the user or other players and/or other video images that are received over the network 200. In other embodiments, the game console 212 may include an integrated monitor, and the monitor 214 may not be needed.

The game console 212 is controlled using a wireless video game controller 216. The video game controller 216 may be substantially the same as the video game controller 120 of FIG. 2, and may be a control pad, a steering wheel, a gun, a mouse, a keyboard, a joystick and/or any other suitable video game control device/input peripheral. The video game controller 216 may have disposed thereon a number of control elements such as buttons, switches, joysticks, keys, dials and/or the like for receiving input from the user to be provided to the game console 212.

To enable proper operation of the wireless video game controller 216, a remote interface module 222 is plugged into a port of or integrated with the game console 212. The port may be any suitable parallel or serial port (e.g., USB port), and, if the game console 212 is a dedicated video game console, the port may be a standard video game controller port.

The remote interface module communicates with the wireless video game controller using any suitable wireless communications technology such as, for example, radio frequency communications and/or BLUETOOTH™. The video game controller 216 has a built-in speaker 218 and a built-in microphone 220. Using the built-in speaker 218 and the built-in microphone 220, a user at the location of the game console 212 may communicate with other on-line game players of the network 200. For example, the on-line game player on the game console 202 may communicate verbally with the on-line game player on the game console 212 over the network 200 while playing an on-line game together. Of course, there may be other players on-line who have controllers with integrated speaker and headphone according to the embodiments of the present invention, and/or conventional headsets, earphone, headphones, microphones, and the like, who are on the network 200 and who are playing the on-line game together with the players on the game consoles 202 and 212. The video game controller 216 may also include an integrated/built-in video camera (e.g., a digital video camera) or a port for an external video camera so that the user can engage in video conferences with other players while playing on-line games.

Figure 4:
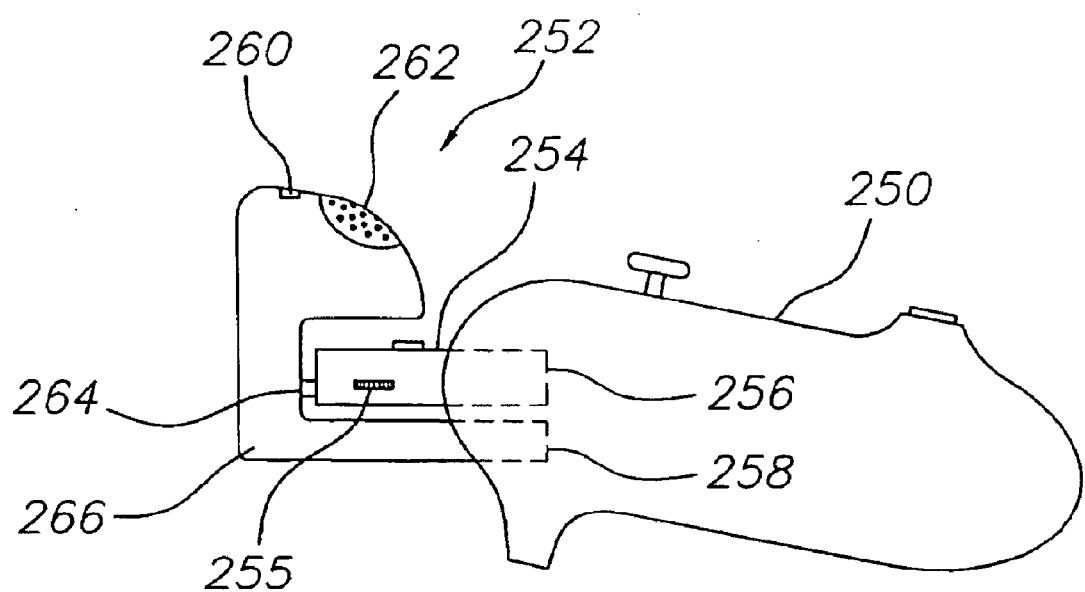
FIG. 4 is a side view of a video game controller expansion module in another exemplary embodiment of the present invention.

FIG. 4 is a side view of an expansion module 252 plugged into a video game controller 250 in another exemplary embodiment of the present invention. The expansion module 252 has a microphone 260 and a speaker 262. The expansion module also includes an adapter 254, which plugs into an "upper" expansion slot ("expansion port") 256 of the video game controller 250. The adapter 254 includes interface circuitry for interfacing with the video game controller 250.

The adapter 254 may be separated from the rest of the expansion module 252, which is plugged into a plug 264 of the adapter 254 for communication of digitized sound (e.g., voice) signals. In other embodiments, the adapter 254 may be implemented in a single housing with the rest of the expansion module 252. In still other embodiments, the adapter 254 may be an existing adapter that is configured to be plugged into an expansion port of a video game controller, and the expansion module may interface with the existing adapter. The adapter 254 has a thumb wheel 255 for controlling volume, for example.

The expansion module 252 has an extending portion 266 for plugging into a "lower" expansion slot ("expansion port") 258. This coupling between the expansion module 252 and the controller 250 provides a structural support and stability to the expansion module 252.

FIG. 5. is a system block diagram of an expansion module 320, which may be substantially the same as the expansion module 252 of FIG. 4. The expansion module 320 includes a built-in speaker 308 and a built-in microphone 310. The expansion module 320 is electrically coupled to a video game controller 320 through an adapter 318. In other embodiments, the adapter may be an existing adapter and/or a unit separate from the expansion module 320.

As with embodiments described above, the video game controller 302 may be a control pad, a steering wheel, a gun, a mouse, a keyboard, a joystick and/or any other suitable video game control device/input peripheral. The video game controller 302 may have disposed thereon a number of control elements such as buttons, switches, joysticks, keys, dials and/or the like for receiving input from the user.

The video game controller 302 has at least one port 332 which can interface with the expansion module 320. For example, if the video game controller 302 is a game controller for the XBOX video game console, it may have two expansion slots for memory cards or other accessories. The expansion module 320 may be electrically coupled through an expansion slot (i.e., port 332) on such a controller, such as an upper expansion slot, for example. In addition, as can be seen in FIG. 4, the expansion module 320 may have an extending portion that physically plugs into a lower expansion slot to provide physical support and stability.

The microphone 310 and the speaker 308 are electrically coupled to the adapter 318 so that the microphone converts voice into electrical signals that are transmitted through the adapter 318 and the video game controller 302 to the game console 100. Further, the speaker 308 converts electrical signals received from the game console 300 through the video game controller 302 and the adapter 318 into audible signals.

The expansion module 320 may have a connector or a plug for electrically coupling a video camera 314. In other embodiments, the expansion module may include an integrated video camera.

In FIG. 5, the game controller 302 interfaces with the game console 100, which is coupled to the monitor 104, through interface circuitry 312. In an alternate embodiment, the game controller 302 can be coupled wirelessly to the game console 100 and interface with the game console 100 through a wireless communication channel similar to the one explained with regard to FIG. 2.

Further, the expansion module 320 and the game controller 302 may be used to play an on-line game over a network, such as the network 200 of FIG. 3. In that case, the expansion module 320 and the controller 302 may simply replace either the video game controller 206 or the video game controller 216. Of course, the expansion module 320 and the controller 302 may be coupled to another video game console on the network 200.

It will be appreciated by those with ordinary skill in the art that the invention can be embodied in other specific forms without departing from the spirit or essential character thereof. The embodiments described above should be considered to be illustrative and not restrictive. The scope of the invention is indicated by the appended claims, and all changes that come within the meaning and range of equivalents thereof are intended to be embraced therein.

We claim:

1. A video game controller for a game console configured for playing an on-line game over a network, the video game controller comprising:

a plurality of control elements suitable for receiving input from a user;

interface circuitry for communicating with at least one other game console through the game console over the network;

a built-in microphone for converting voice into an electrical signal output to be transmitted through the interface circuitry and the game console to said at least one other game console; and a built-in speaker for converting an electrical signal output from said at least one other game console received through the interface circuitry and the game console into an audible signal.

2. The video game controller of claim 1, further comprising a built-in video camera for taking video images to be transmitted to the game console.

3. The video game controller of claim 1, further comprising a slot or a port for receiving output from an external video camera.

4. The video game controller of claim 2, wherein the built-in video camera is a digital camera.

5. The video game controller of claim 1, further comprising a remote transceiver coupled to the interface circuitry for wireless communication with the game console.

6. The video game controller of claim 1, wherein the video game controller is configured for coupling to at least one selected from a group consisting of a standard controller port, a parallel port, a serial port, and a universal serial bus port of the game console.

7. An expansion module for a video game controller of a game console configured for playing an on-line game over a network, such controller having an expansion port or slot for receiving the expansion module, the expansion module comprising:

a built-in microphone for converting voice into an electrical signal output to be transmitted through the video game controller and the game console to at least one other game console over the network; and a built-in speaker for converting an electrical signal output from said at least one other game console received through the video game controller and the game console into an audible signal.

8. The expansion module of claim 7, further comprising an adapter for interfacing with the video game controller.

9. The expansion module of claim 8, wherein the adapter can be physically separated from the rest of the expansion module, and wherein the adapter has at least one plug for interfacing with the rest of the expansion module to transfer digitized sound signals between the adapter and the rest of the expansion module.

10. The expansion module of claim 7, wherein the expansion module is electrically coupled to the video game controller through an adapter.

11. The expansion module of claim 10, further comprising an extending portion for physically plugging into a first expansion slot of the video game controller, wherein the adapter plugs into a second expansion slot of the video game controller.

12. The expansion module of claim 7, further comprising a built-in video camera for taking video images to be transmitted to the game console.

13. The expansion module of claim 7, further comprising a slot or a port for receiving output from an external video camera.

14. An on-line game system for playing an on-line game over a network, the on-line game system comprising:

a plurality of game consoles, each said game console running software for the on-line game; and a plurality of video game controllers, each said video game controller being coupled to a corresponding one of the game consoles, wherein at least one of the video game controllers is a first video game controller having a first built-in microphone and a first built-in speaker or a second video game controller coupled to an expansion module having a second built-in microphone and a second built-in speaker.

15. The on-line game system of claim 14, wherein at least one of the first video game controller and the expansion module has a built-in video camera.

16. The on-line game system of claim 14, wherein at least one of the first video game controller and the expansion module has a slot or a port for receiving output from an external video camera.

17. The on-line game system of claim 15, wherein the built-in video camera is a digital camera.

18. The on-line game system of claim 14, wherein at least one of the first and second video game controllers includes a remote transceiver for wireless communication with the corresponding one of the game consoles.

19. The on-line game system of claim 14, wherein the first video game controller further includes:

a plurality of control elements suitable for receiving input from a user; and interface circuitry for communicating with the corresponding one of the game consoles, wherein the first built-in microphone converts voice into an electrical signal output to be transmitted through the interface circuitry, and wherein the first built-in speaker converts an electrical signal output received through the interface circuitry into an audible signal.

20. The on-line game system of claim 14, wherein the expansion module further includes:

an adapter for communicating with the video game controller, wherein the second built-in microphone converts voice into an electrical signal output to be transmitted through the adapter, and wherein the second built-in speaker converts an electrical signal output received through the adapter into an audible signal.

* * * * *